US012258814B2

(12) United States Patent
Capitaine et al.

(10) Patent No.: US 12,258,814 B2
(45) Date of Patent: Mar. 25, 2025

(54) ARTHROPOD PROTECTOR SCREEN AND PRODUCTION METHOD THEREOF

(71) Applicant: GOCAP, Bordeaux (FR)

(72) Inventors: François Capitaine, Bordeaux (FR); Nathalie Gauduchou Capitaine, Bordeaux (FR)

(73) Assignee: GOCAP, Bordeaux (FR)

(*) Notice: Subject to any disclaimer, the term of this patent is extended or adjusted under 35 U.S.C. 154(b) by 1106 days.

(21) Appl. No.: 17/049,620

(22) PCT Filed: Apr. 24, 2019

(86) PCT No.: PCT/FR2019/050969
§ 371 (c)(1),
(2) Date: Jul. 6, 2021

(87) PCT Pub. No.: WO2019/207250
PCT Pub. Date: Oct. 31, 2019

(65) Prior Publication Data

US 2022/0003040 A1 Jan. 6, 2022

(30) Foreign Application Priority Data

Apr. 24, 2018 (FR) ........................................ 1853579

(51) Int. Cl.
*E06B 9/52* (2006.01)

(52) U.S. Cl.
CPC .................................... *E06B 9/521* (2013.01)

(58) Field of Classification Search
CPC ...... E06B 9/52; E06B 9/521; E06B 2009/524; E06B 7/02; E06B 9/24
See application file for complete search history.

(56) References Cited

U.S. PATENT DOCUMENTS 2,294,966 A 9/1942 Dreyfus
3,703,432 A * 11/1972 Koski ...................... A41D 3/04 264/156
4,969,291 A 11/1990 Camara
5,570,542 A 11/1996 Cameron
(Continued)

FOREIGN PATENT DOCUMENTS

BE 461820 1/1946
EP 2998034 3/2016
(Continued)

OTHER PUBLICATIONS

International Search Report issued on International Patent Application No. PCT/FR2019/050969 dated Sep. 20, 2019.

*Primary Examiner* — Abe Massad
(74) *Attorney, Agent, or Firm* — Perman & Green, LLP

(57) ABSTRACT

A protector screen for use against arthropods, includes, a sheet having a core made from glass or a plastic material, which is at least partially transparent, and comprising a plurality of ventilation holes, each of said ventilation holes being designed to prevent arthropods from passing therethrough, at least a portion of each ventilation hole being closed by a lateral wall or by contiguous lateral walls forming a single piece that is open at the ends thereof, and the ventilation holes being designed such that a gaseous fluid, such as air, can pass through the screen, while optimising light transmission and optionally cooling the fluid passing through the screen.

10 Claims, 3 Drawing Sheets

(56) References Cited

U.S. PATENT DOCUMENTS

| | | | | |
|---|---|---|---|---|
| 9,109,390 | B1 * | 8/2015 | Cavuoti | E06B 9/52 |
| 11,525,302 | B2 * | 12/2022 | Earles | E06B 7/32 |
| 2012/0080153 | A1 * | 4/2012 | Croteau | E06B 7/03 160/181 |
| 2012/0248816 | A1 * | 10/2012 | Wan | E05C 1/08 49/149 |
| 2016/0082374 | A1 | 3/2016 | Dietschreit | |
| 2018/0258695 | A1 * | 9/2018 | Earles | F21V 33/006 |

FOREIGN PATENT DOCUMENTS

| | | |
|---|---|---|
| KR | 20090120275 | 11/2009 |
| LU | 41337 | 5/1962 |

* cited by examiner

ARTHROPOD PROTECTOR SCREEN AND PRODUCTION METHOD THEREOF

CROSS-REFERENCE TO RELATED APPLICATIONS

This application is a National Stage of International Application No. PCT/FR2019/050969, having an International Filing Date of 24 Apr. 2019, which designated the United States of America, and which International Application was published under PCT Article 21(2) as WO Publication No. 2019/207250 A1, which claims priority from and the benefit of French Patent Application No. 1853579, filed on 24 Apr. 2018, the disclosures of which are incorporated herein by reference in their entireties.

BACKGROUND

1. Field

The present disclosure concerns a protector screen, the aim of which is to prevent arthropods, in particular insects and spiders, from passing through, in order to insulate a construction such as a home or a building, a greenhouse in order to protect a crop, or indeed a vehicle for transporting at least one human being and/or animal, while allowing sufficient ventilation.

It also concerns a method for producing such a protector screen.

2. Brief Description of Related Developments

The use of mosquito nets for combating the intrusion of insects, in particular mosquitoes and/or flies, into a home, has long been known.

These mosquito nets are implemented in order to block openings and form a barrier against the insects while allowing good air exchange.

Mosquito nets that are currently available are typically produced by weaving with a simple perpendicular crossing of the warp and weft threads.

The meshes of these mosquito nets define openings that typically have dimensions of between 1 and 2 mm, in order to prevent insects from passing through while ensuring good ventilation.

However, it has been noted that these mosquito nets do not perform well over time, with at least some of their openings deteriorating more or less rapidly, for example as a result of thread slippage, tearing, repeated rubbing, stretching, or indeed fraying due to the net being cut, etc.

This structural deterioration of the mosquito net reduces its effectiveness and can then give insects free access.

Moreover, it has been noted that the weaving methods that are generally implemented cannot guarantee a regular basic mesh size, meaning that mosquito nets, even when new, can have openings of variable dimensions.

Yet a minor variation in the dimensions of an opening can allow an insect to pass through, in particular *Aedes albopictus*, also known as the tiger mosquito, which has small dimensions.

However, the latter is well known for being the main vector of various viral diseases, such as dengue, chikungunya, Zika virus or yellow fever.

Another type of mosquito, anopheles, can be the main carrier of the malaria parasite, which is particularly dangerous for newborns, children or pregnant women with weakened immune systems. This disease, which essentially affects Asia, South America and Africa, weighs considerably on the resources of the affected countries and on the populations concerned.

In the 1980s, it was proposed that mosquito nets should be pre-impregnated with insecticide in order to increase their effectiveness.

Moreover, the World Health Organization (WHO) recommends widespread access to these pre-treated mosquito nets in endemic areas, particularly malaria-endemic areas.

The long-lasting insecticidal nets (LLIN's) that are currently recommended are treated with pyrethroids. However, their extensive use in recent years has resulted in an increase in resistance selection to these insecticides in mosquitoes.

In any event, it is acknowledged that mosquito nets with or without chemical additives have low resistance to tearing, which reduces their useful life.

The WHO estimates that approximately half of the mosquito nets in use have holes in them, or are more generally ineffective after a few days of use.

Moreover, pre-impregnating mosquito nets does not solve all of the observed problems:

- the use of chemical products is likely to cause irritation to some users, and problems relating to waste at the end of the life of the products need to be addressed,
- the useful life of the insecticide is estimated on average to be a few months, because it is not resistant to repeated washing (2008 WHO report),
- resistance to the insecticides used has been growing for a number of years ("Moustiquaires imprégnées et résistance des moustiques aux insecticides" (Impregnated mosquito nets and mosquito resistance to insecticides), Frédéric Darriet, IRD éditions, Collection: les didactiques, 2007, and Mark Roland 2007), which can have serious health consequences on the affected populations.

Moreover, and more generally, it is noted that the mosquito nets currently available on the market have low transparency and therefore reduce the field of vision, or at best cause visual disturbance.

This is the case, in particular, with metal mosquito nets, which have good mechanical strength, but offer very poor transparency.

There is therefore a pressing need for a protector screen for use against arthropods whose original design allows the disadvantages of the prior art disclosed above to be overcome.

SUMMARY

The aim of the present disclosure is to overcome the disadvantages of the prior art by proposing a protector screen for use against arthropods that is simple in design and operation, forming a genuine mechanical barrier to the passage of these arthropods, that is free of insecticide and performs excellently over time, while ensuring adequate air exchange therethrough.

One object of the present disclosure is such a protector screen offering a high level of transparency and, for example, suitable for replacing clear glass in a glazing unit.

Another object of the present disclosure is such a protector screen in which the original shape of the ventilation openings ensures that air exchange is maximized through the screen while preventing arthropods from passing through.

Yet another object of the present disclosure is such a protector screen having increased light transmission in order to ensure good visibility through same.

The present disclosure also concerns a method for producing such a protector screen for use against arthropods.

To this end, the disclosure concerns a protector screen for use against arthropods, such as insects, cockroaches and spiders, comprising

- a sheet comprising a core made from glass or from plastic material, said sheet being at least partially transparent, and comprising a plurality of ventilation holes,
- each of said ventilation holes being configured to prevent arthropods from passing therethrough,
- said ventilation holes being intended to allow a gaseous fluid to pass through this screen, said sheet having two faces.

According to the disclosure, at least one of the portions of at least some of said ventilation holes opening on said faces has a straight, elongate cross section, said section comprising a longitudinal axis and a transverse axis, the dimension of each of said portions along the longitudinal axis being greater than the largest dimension of the arthropods against which the screen provides protection, the dimension of each portion along the transverse axis being less than or equal to the largest dimension of the main body of the arthropods against which the screen provides protection, this main body excluding the head and the appendages of the corresponding arthropods.

Thus, this sheet forming the protector screen typically comprises two faces and a peripheral edge, ventilation holes passing through the thickness of this sheet such that their free ends open on these two faces, and air is allowed to flow through this sheet.

For at least some of the ventilation holes of this sheet, at least one free end of these ventilation holes therefore has a cross section that is straight, for example in the plane formed by the corresponding face, and elongate, for example oblong, elliptical or even oval in shape. This elongate cross section thus comprises a longitudinal axis and a transverse axis, its dimension along the longitudinal axis being greater than the largest dimension of the arthropods against which the screen provides protection, the dimension along the transverse axis being less than or equal to the largest dimension of the main body of the arthropods against which the screen provides protection, this main body excluding the head and the appendages of the corresponding arthropods.

"Appendage" should be understood, for example, to mean a locomotor appendage such as a leg of the arthropod.

It is therefore observed that the protector screen of the disclosure maximizes air exchanges through the sheet while preventing arthropods from passing therethrough, or forming a mechanical barrier impassable to the arthropods against which it is intended to provide protection.

Advantageously, the two free ends of at least some of the ventilation holes of this sheet have such a straight cross section without necessarily being identical. In this case, the screen does not have a particular mounting direction.

Generally, the part of these ventilation holes situated between these two free ends, and therefore in the thickness of the sheet, can be of any kind, for example with a section that is constant or, on the contrary, flared, for example conical and/or having a narrowing.

Each ventilation hole of this protector screen is at least partially delimited laterally by a lateral wall or by a ring of lateral walls that is closed, open at its ends and unitary, or indeed in a single piece, which belongs to said sheet. Advantageously, since this closed lateral wall or ring of lateral walls laterally delimiting at least part of the corresponding hole is not the result of threads being assembled or tied together, as obtained by weaving or knitting in the mosquito nets of the prior art, it has an excellent mechanical performance over time. Each opening is therefore not susceptible to deformation, or variation in its dimensions, over time, unless the corresponding opening is deliberately damaged.

For example, since the sheet is made up solely of said core made from glass or from plastic material, the lateral wall or the ring of lateral walls laterally delimiting each of the ventilation holes forms an integral structure with the rest of this sheet.

In other words, and more generally, for each of said ventilation holes, the lateral wall or the ring of lateral walls laterally delimiting at least the part of the corresponding ventilation hole at said core, forms a single unit, or integral structure, with the latter.

These ventilation holes can be identical or, in at least some cases, have different dimensions and/or shapes while being configured to prevent arthropods from passing therethrough.

The variations in the dimensions of the ventilation holes from one protector screen to another can, for example, depend on the geographical area for which the protector screen in question is intended, taking into account the arthropod species that live there, for at least some of which it will be designed to form a mechanical barrier preventing passage therethrough.

More generally, depending on the needs and the destination of a given protector screen, a trade-off may be sought in its design between the extent of its effectiveness against arthropod species, its transparency, its mechanical resistance, for example to impacts, and the exchanges of gaseous fluid that it allows through it.

This sheet can comprise one or more functional layers covering the core made from glass or from plastic material on at least one of its faces. In this case, the protector screen is constituted by an at least partially transparent multilayer sheet that is perforated.

Naturally, this protector screen can also have one or more fastening holes, which are different to the ventilation holes and are not intended to allow a gaseous fluid to pass through the screen.

Preferably, apart from its holes, the sheet is solid and substantially continuous in terms of its mechanical and chemical properties, to within manufacturing tolerances.

When the core of this sheet is made from polymer, it is advantageously an extruded sheet, a molded sheet or indeed a sheet obtained by casting or by three-dimensional (3D) printing.

Advantageously, such a protector screen forms a purely mechanical barrier, which eliminates all the problems currently encountered with the extensive use of mosquito nets pre-impregnated or covered with insecticide.

In different specific aspects of this protector screen, each having its own specific advantages and being suitable for many possible technical combinations:

- at least a majority of these ventilation holes has a constant section or comprises at least one reduction in section in a direction extending between the two faces of said sheet.

Advantageously, each ventilation hole has a flared shape, for example a conical shape.

Alternatively, each ventilation hole comprises a constriction. For example, this constriction can be positioned at a portion of the ventilation hole opening on a face of this sheet or in the thickness of the sheet, for example being positioned in a central or substantially central part of the corresponding ventilation hole.

In the latter case, the ventilation hole can have a longitudinal section, i.e. in a direction extending between the two faces of the sheet, having a shape reminiscent of the general shape of a diabolo. To reiterate, such a ventilation hole comprises a first portion that is flared, followed by a constriction, followed by a third portion that is flared. Very advantageously, such an aspect helps reduce the visual impact of the molded presence, in the corresponding ventilation hole, of one or more layers in order to increase the light transmission coefficient of the sheet, regardless of the viewing angle. Indeed, the projected surface area or footprint of this ventilation hole, for a given opening diameter, is minimized, regardless of the viewing angle.

Furthermore, such a configuration of the ventilation holes helps substantially lower the temperature of the air flowing through the protector screen, thus cooling the air when outside temperatures are hot. It has been observed that this cooling was even more pronounced when air temperatures were high.

this sheet is configured to cool the air passing therethrough, or indeed passing through its ventilation holes.

In this case, the sheet has a thickness, and at least a majority of its ventilation holes and preferably all of its ventilation holes have a longitudinal section configuration, that ensure the air passing through this sheet is cooled.

For example, the longitudinal section of each ventilation hole is flared, for example conical, or indeed has a narrowing such as a constriction.

Such cooling of the air passing through the screen is even more pronounced when the flow rate of air passing through the sheet is high, the air is hot or indeed the narrowing in the section of each ventilation hole is significant.

the lateral movement of a ventilation hole during elastic deformation of the sheet being $\Delta x$, 2 $\Delta x$ is less than or equal to the largest dimension or, better still, the smallest dimension, of the main body of the arthropods against which the screen provides protection, this main body excluding the head and the appendages of the corresponding arthropods.

This helps advantageously ensure that, even in the event of elastic deformation of the sheet, for example under the effect of wind, the arthropods against which the protector screen provides protection remains effective, forming a barrier impenetrable to them.

This value $\Delta x$ is dependent on the material or materials that make up the sheet, the thickness thereof, its dimensions and the stress applied. The value 2 $\Delta x$ is the maximum opening obtained when the upper and lower parts of a ventilation hole move in opposite directions, without plastic deformation, when external force is applied to the screen in a direction perpendicular or substantially perpendicular thereto, while the screen is kept in position, for example by its peripheral edge.

the surface area of each ventilation hole is greater than 2000 $\mu m^2$ and more advantageously greater than 3500 $\mu m^2$ in order to allow sufficient exchange of gaseous fluid through the protector screen.

This is the minimum surface area required for each ventilation hole to ensure satisfactory ventilation.

said screen has a light transmission coefficient that is greater than or equal to 70%, and more advantageously greater than 80%, said ventilation holes have a straight cross section that is oval, elliptical or oblong, the section of each hole has a value Ga of between 0.1 and 8 mm in its largest dimension and a value Pa of between 500 μm and 1.2 mm in its other dimension, the value Ga being greater than the largest dimension of the arthropods against which the screen provides protection, whereas its value Pa is less than or equal to the largest dimension of the main body of the arthropods against which the screen provides protection, this main body excluding the head and the appendages of the corresponding arthropods.

Such an aspect is particularly advantageous, for purely illustrative purposes, for forming a protector screen for use against mosquitoes and, in particular, the tiger mosquito.

Surprisingly, it was observed during tests that, although one of the dimensions of oval, oblong or indeed elliptical ventilation holes is large, or indeed greater than the largest dimension of the arthropods against which the screen provides protection, in order to increase exchanges of gaseous fluid through the screen, the latter constituted a mechanical barrier impassable to the arthropods against which it was designed.

said sheet has a thickness of between 50 μm and 10 mm, and more advantageously of between 150 μm and 6 mm.

Thus, and depending on its thickness, the sheet can be flexible, semi-rigid or rigid.

the opening ratio of said sheet, defined as the ratio of the surface area of the ventilation holes to the total surface area of said sheet, is greater than 1%, and preferably between [1% and 50%].

Even more preferably, this opening ratio is between [2% and 25%].

said sheet comprises a core produced from a material chosen from the group comprising polycarbonate, poly (methyl methacrylate) (PMMA), a polyethylene, a polypropylene, an ethylene/propylene copolymer, polyurethane, polystyrene, acrylonitrile butadiene styrene (ABS), polyethylene terephthalate (PET) or indeed a combination of several thicknesses of a same material from these plastic materials or several plastic materials.

More generally, any polymer recognized for its optical transparency properties can be implemented.

this protector screen is flat or essentially flat, or indeed non-flat.

In the latter case, it can, for example, be at least partially curved or domed.

the outer face of the core of said sheet comprises one or more anti-scratch layers, and/or at least one anti-reflective layer covering at least part of same and/or a masking layer such as a colored layer, preferably positioned under at least one anti-scratch layer, the sheet can also be treated against UV rays.

For example, in this case it comprises, in its mass, a UV absorber or at least an anti-UV film, which covers at least one face of said core.

said ventilation holes are arranged on said sheet in such a way as to represent a drawing, a pattern, a sign such as a number, a letter or a pictogram, or indeed a combination of these elements.

Alternatively, these ventilation holes can also be aligned and spaced apart at regular intervals.

each ventilation hole comprising a lateral wall, or a ring of lateral walls, that is unitary; for at least some of said ventilation holes, the portion of at least one face of said sheet delimiting the edge of each of these ventilation holes and/or the lateral wall, or the ring of lateral walls, each delimiting corresponding holes, comprises at least one layer configured to increase the light transmission coefficient of said sheet relative to the light transmission coefficient of a same sheet whose ventilation holes are not provided with said layer or layers.

The portion of the face of the sheet delimiting the edge of a ventilation hole is therefore indeed the portion of this face immediately adjacent to the ventilation hole in question, and not the whole of this face.

Preferably, said at least one layer configured to increase the light transmission coefficient comprises a layer of colored fillers, preferably dark-colored fillers, for example black, grey, brown or yellow pigments.

"Colored fillers" should be understood in this context to mean solid colored particles that are intended to improve the light transmission properties of the support on which they are placed by adsorbing the light rays passing through them, which makes it possible, in particular, to eliminate light interference. These particles can be added to a composition with a view to depositing them on a surface, or can be formed by the interaction of a heat source with the material constituting this support.

Preferably, this lateral wall or ring of lateral walls radially delimiting the corresponding ventilation hole comprises a plurality of layers configured to increase the light transmission coefficient of said sheet.

Advantageously, said layer or layers are positioned at the surface of said lateral wall or walls and/or in the thickness of said sheet.

For example, the total thickness of said layer or layers is between 0.1 and 250 μm.

Optically treating the inner surface of each ventilation hole by forming one or more layers of a dark color, such as black or grey, makes it possible to absorb and/or block the (reflected and diffracted) light rays propagating in the layer or layers thus formed.

Surprisingly, it is observed that the formation of this layer or these layers helps substantially improve the light transmission of the sheet compared with a sheet whose ventilation holes have not been treated, because it minimizes the diffraction and reflection phenomena caused by the presence of ventilation holes in the sheet. This results in substantially improved visual comfort for the user.

Said layer or layers thus formed form layers for absorbing the stray light rays that pass through them.

said sheet being produced from a plastic material, its peripheral part comprises an additional thickness formed by the addition of an overmolded plastic material.

The present disclosure also concerns a glazing element constituted by a protector screen for use against arthropods, as previously described.

Advantageously, this glazing element is transparent and has a light transmission coefficient that is greater than or equal to 70%, and more advantageously greater than 80%.

Preferably, this glazing element can be treated against UV rays.

The present disclosure also concerns a construction element comprising a protector screen for use against arthropods, as previously described.

For purely illustrative purposes, this construction element can be a window comprising a fixed frame and a movable frame that can pivot relative to the fixed frame, the movable frame being equipped with at least one protector screen as described previously serving as glazing. Alternatively, this construction element can comprise a first transparent glazing mounted on the movable frame and such a protector screen received in a recess of the fixed frame, this screen forming a transparent or opaque second glazing that is fixed. In this latter case, it is then possible to move the movable frame from a first position referred to as the closed position, in which it is fully pressed against the fixed frame, sealing the construction element, to a second position referred to as the open position, in which the movable frame no longer provides a seal with the fixed frame but allows air to pass through.

This construction element can also be a slab or a frame intended to close an opening in a construction. These can be colored.

Thus, this construction element can be used, in particular, in applications for closing an opening in a construction such as a building, a house or an apartment block.

The present disclosure also concerns a shell for a child's travel vehicle, such as a pushchair or a pram, or for a bed such as a cradle, comprising a protector screen for use against arthropods, as previously described.

Advantageously, this shell, which is mounted on, or connected to, the chassis of the vehicle, or the bed, helps close the latter in order to insulate the child or newborn from the arthropods for which this screen is intended, while ensuring sufficient ventilation.

The present disclosure also concerns the use of a protector screen for use against arthropods, as previously described, for insulating a space from mosquitoes, in particular tiger mosquitoes, while allowing adequate ventilation of the space, the latter being intended to be occupied by humans, animals or food.

More generally, the present protector screen is applicable in many technical fields, for example in filtering screens for mosquito traps, window/mosquito net combinations (when the window is open, the mosquito net automatically replaces the window), ventilation plates or screens for residential or industrial buildings, cable entry plates, in particular for preventing pests from passing through while ensuring good ventilation.

The present disclosure also concerns a method for producing a protector screen for use against arthropods, as described previously.

According to the disclosure, a sheet comprising a core made from glass or from plastic material is provided, said sheet being at least partially transparent, at least one removable protection layer covering at least one face of said sheet, and ventilation holes are made in the assembly comprising said sheet and said at least one removable protection layer, the latter being arranged so as to allow air to pass through said sheet, each of said ventilation holes also being configured to prevent arthropods from passing therethrough.

According to one aspect of the method of the present disclosure, said ventilation holes are arranged on said sheet in such a way as to represent a drawing, a pattern, a sign such as a number, a letter or a pictogram, or indeed a combination of these elements.

According to another aspect of the method of the present disclosure, the ventilation holes are made in this assembly by pure water jet cutting, or by laser, or by milling.

With existing methods, the more holes there are, the more vision through the perforated sheet is impaired, which is the case, in particular, with mosquito nets. Indeed, the holes themselves produce a visual disturbance and the surfaces surrounding the holes often have deteriorated optical properties. This is further accentuated when the sheet is thicker.

The deteriorations created around the holes (edge effect) are caused by the spraying of additives (in a water jet), by a blade with an inadequate profile (cutting of the core, punching), by a drill/milling blade of unsuitable geometry (drilling), by excessive heating of the material (laser), by a bead of material (perforation), or by a weld line (injection).

Finally, there is currently no method capable of accurately producing holes of a small size, for example of the order of a millimeter in the case of mosquito nets providing a barrier against tiger mosquitoes, while allowing very good ventilation, and largely retaining the optical properties of the material of the sheet in the areas close to the holes.

Therefore, the ventilation holes are preferably produced:

by pure water jet cutting in order to avoid impacts at the periphery of the holes caused by additives added to water in order to improve cutting. Indeed, such impacts deteriorate the optical properties of the material. By way of example only, a Mecanumeric quickjet II® machine can be used to perform cutting operations.

by laser cutting with short-duration pulses of typically less than a few milliseconds in order to prevent excessive heating in the vicinity of the holes. For example, a $CO_2$ Trotec Speedy 100® laser machine can be used.

by milling, for example with a single thread milling cutter allowing the chips to be ejected, at a speed of the order of 10,000 rpm. For example, a CharlyRobot 2U® machine can be used.

In all these examples, the cutting path can be started in the shape to be cut out in order to prevent irregularities in the finished product.

According to yet another aspect of the method of the present disclosure, having made said ventilation holes, and at least one face of said sheet still being covered with said at least one removable protection layer, there is formed, for at least some of said ventilation holes, on the portion of at least one face of said sheet delimiting the edge of each of these ventilation holes and/or the lateral wall, or the ring of lateral walls, each delimiting corresponding holes, at least one layer configured to increase the light transmission coefficient of said sheet relative to the light transmission coefficient of a same sheet whose ventilation holes are not provided with said layer or layers.

Preferably, said at least one layer configured to increase the light transmission coefficient of this sheet will be formed from at least one layer of colored fillers, which shall be obtained:

by implementing a laser beam in order to carry out a surface treatment such as, for example, the process referred to as thermal foaming, by depositing a suitable aerosol paint composition, by a sol-gel process, or indeed by depositing a solution comprising a solvent and colored fillers.

In the first case, the advantages of using a laser beam to carry out "thermal foaming" are linked, in particular, to the fact that particularly accurate results can be obtained and the foam colors can be varied.

As a purely illustrative example, a laser source can be implemented with a wavelength of 1.06 μm, a power of 10 W and a scan speed of 35 m/min on a sheet of polycarbonate. This produces dark grey coloring that can be localized in the immediate vicinity of the holes and on the walls of the ventilation holes accessible to the laser beam.

For the two other treatment methods identified above, the solvent is chosen depending on the polymer constituting the sheet in question so as to be able to dissolve its surface and embed the colored fillers.

For purely illustrative purposes, this solvent can be an organic solvent such as methanol, cyclohexanone, acetone, pyridine or dichloromethane. This solvent can be used pure or in a mixture, for example with water.

For example, in this case the mixture can be dispersed by spraying with a standard paint spray gun with a small-diameter nozzle, or by a screen-printing type coating, or indeed by a sol-gel dipping type coating. The masked surfaces, for example masked with the protection layer, as well as at least the edge of the ventilation holes left exposed by the hole, will then be covered.

The main advantage of using these techniques is the speed of implementation on large surface areas.

For purely illustrative purposes, a mixture associated with PMMA can be made up of 95 vol % acetone with 5% carbon black, such as, for example, Emperor 1200 from the company Cabot®, or any other carbon having very fine particles, that is compatible with solvents and that has good rheological behavior in order to ensure good implementation. This mixture is, for example, sprayed using a Revell® airbrush having a 0.1 mm nozzle.

In any event, it is possible to add to the solvent, alone or with the coloring agent, photochromic elements made from silver chloride (such as Sigma Aldrich® AgCl having a purity of more than 99%), in particular for a glass sheet, or spirooxazine (Tokyo Chemical Industries®) in particular for polymers.

The advantage of photochromic agents is that they become darker as the light rays increase, i.e. when the diffusion of light in the sheet, mostly caused by the large number of holes, needs to be limited. Compared with a situation where no treatment is used, it is observed that the small disturbance that may be caused by the presence of the colored fillers is non-existent when the light rays are of low intensity.

The colored fillers can also be incorporated into a polymer (via a master batch) in order to ensure good mixing with the solvent.

According to yet another aspect of this method, said layer or layers are formed at the surface of said lateral wall or walls and/or in the thickness of said sheet.

For purely illustrative purposes, the total thickness of said layer or layers is between 0.1 and 250 μm.

The present disclosure also concerns a protector screen for use against arthropods comprising a sheet comprising a core made from glass or from plastic material, said sheet being at least partially transparent, and comprising a plurality of ventilation holes, each of said ventilation holes being configured to prevent arthropods from passing therethrough, said ventilation holes being intended to allow a gaseous fluid to pass through this screen and said screen has a light transmission coefficient that is greater than or equal to 70%, and more advantageously greater than 80%.

According to one aspect of this screen, the surface area of each ventilation hole is greater than 2000 $\mu m^2$ and more advantageously greater than 3500 $\mu m^2$ in order to allow sufficient ventilation, or exchange of gaseous fluid through the protector screen.

According to yet another aspect of this screen, the opening ratio of said sheet, defined as the ratio of the surface area of the ventilation holes to the total surface area of said sheet, is greater than 1%, and preferably between [1% and 50%]. Even more preferably, this opening ratio is between [2% and 25%].

The present disclosure also concerns a protector screen for use against arthropods such as insects, cockroaches and spiders, comprising a sheet comprising a core made from glass or from plastic material, said sheet being at least partially transparent, and comprising a plurality of ventilation holes, each of said ventilation holes being configured to prevent arthropods from passing therethrough, said ventilation holes being intended to allow a gaseous fluid to pass through this screen.

According to the disclosure, each ventilation hole comprising a lateral wall, or a ring of lateral walls, that is unitary, for at least some of said ventilation holes, the portion of at least one face of said sheet delimiting the edge of each of these ventilation holes and/or the lateral wall, or the ring of lateral walls, each delimiting corresponding holes, comprises at least one layer configured to increase the light transmission coefficient of said sheet relative to the light transmission coefficient of a same sheet whose ventilation holes are not provided with said layer or layers.

According to one aspect of this protector screen, said at least one layer comprises a layer of colored fillers, preferably dark-colored fillers and more advantageously black or grey fillers.

According to another aspect of this screen, the surface area of each ventilation hole is greater than 2000 $\mu m^2$ and more advantageously greater than 3500 $\mu m^2$ in order to allow sufficient ventilation, or exchange of gaseous fluid through the protector screen.

According to yet another aspect of this screen, the opening ratio of said sheet, defined as the ratio of the surface area of the ventilation holes to the total surface area of said sheet, is greater than 1%, and preferably between [1% and 50%].

Even more preferably, this opening ratio is between [2% and 25%].

According to yet another aspect of this protector screen, the rest of said sheet is entirely transparent or translucent.

According to yet another aspect of this protector screen, said lateral wall or said ring of lateral walls comprises a plurality of layers configured to increase the light transmission coefficient of said sheet.

According to yet another aspect of this protector screen, said layer or layers are positioned at the surface of said lateral wall or walls and/or in the thickness of said sheet.

According to yet another aspect of this protector screen, the total thickness of said layer or layers is between 0.1 and 250 μm.

According to yet another aspect of this protector screen, at least a majority of the ventilation holes has a constant section or comprises a reduction in section in a direction extending between the two faces of said sheet.

Preferably, each ventilation hole has a flared shape or comprises a constriction. This constriction can be positioned, for example, in the thickness of the sheet or at a portion of the corresponding ventilation hole opening on a face of this sheet.

According to another aspect of this protector screen, said sheet is configured to cool the air passing through its ventilation holes.

The present disclosure also concerns a protector screen for use against arthropods, such as insects, cockroaches and spiders, comprising a sheet comprising a core made from glass or from plastic material, said sheet being at least partially transparent, and comprising a plurality of ventilation holes, each of said ventilation holes being configured to prevent arthropods from passing therethrough, said ventilation holes being intended to allow a gaseous fluid to pass through this screen.

According to the disclosure, at least a majority of these ventilation holes comprises a reduction in section in a direction extending between the two faces of said sheet.

According to one aspect of this protector screen, each ventilation hole has a flared shape, for example a conical shape. Alternatively, each ventilation hole comprises a constriction.

For purely illustrative purposes, this constriction can be positioned at a portion of the corresponding ventilation hole opening on a face of this sheet or in the thickness of the sheet, for example being positioned in a central or substantially central portion of the corresponding ventilation hole.

In the latter case, the ventilation hole can have a longitudinal section, i.e. in a direction extending between the two faces of the sheet, having a shape reminiscent of a diabolo.

According to another aspect of this protector screen, said sheet is configured to cool the air passing through its ventilation holes.

According to yet another aspect of this protector screen, the lateral movement of a ventilation hole during elastic deformation of the sheet being $\Delta x$, $2\,\Delta x$ is less than or equal to the largest dimension or, better still, the smallest dimension, of the main body of the arthropods against which the screen provides protection, this main body excluding the head and the appendages of the corresponding arthropods.

According to yet another aspect of this protector screen, each ventilation hole comprising a lateral wall, or a ring of lateral walls, that is unitary, for at least some of said ventilation holes, the portion of at least one face of said sheet delimiting the edge of each of these ventilation holes and/or the lateral wall, or the ring of lateral walls, each radially delimiting corresponding holes, comprises at least one layer configured to increase the light transmission coefficient of said sheet relative to the light transmission coefficient of a same sheet, or identical sheet, whose ventilation holes are not provided with said layer or layers.

According to yet another aspect of this protector screen, said lateral wall or said ring of lateral walls comprises a plurality of layers configured to increase the light transmission coefficient of said sheet.

According to yet another aspect of this protector screen, said layer or layers are positioned at the surface of said lateral wall or walls and/or in the thickness of said sheet.

According to yet another aspect of this protector screen, said at least one layer is a layer of colored fillers, preferably dark-colored fillers and more advantageously black or grey fillers.

According to yet another aspect of this protector screen, the total thickness of said layer or layers is between 0.1 and 250 μm.

BRIEF DESCRIPTION OF THE DRAWINGS

Other advantages, aims and special features of the present disclosure will be understood upon reading the following description, which is provided for explanatory purposes and is in no way limiting, in view of the appended drawings, in which.

DETAILED DESCRIPTION

It should first be noted that the figures are not to scale.

Figure 1:
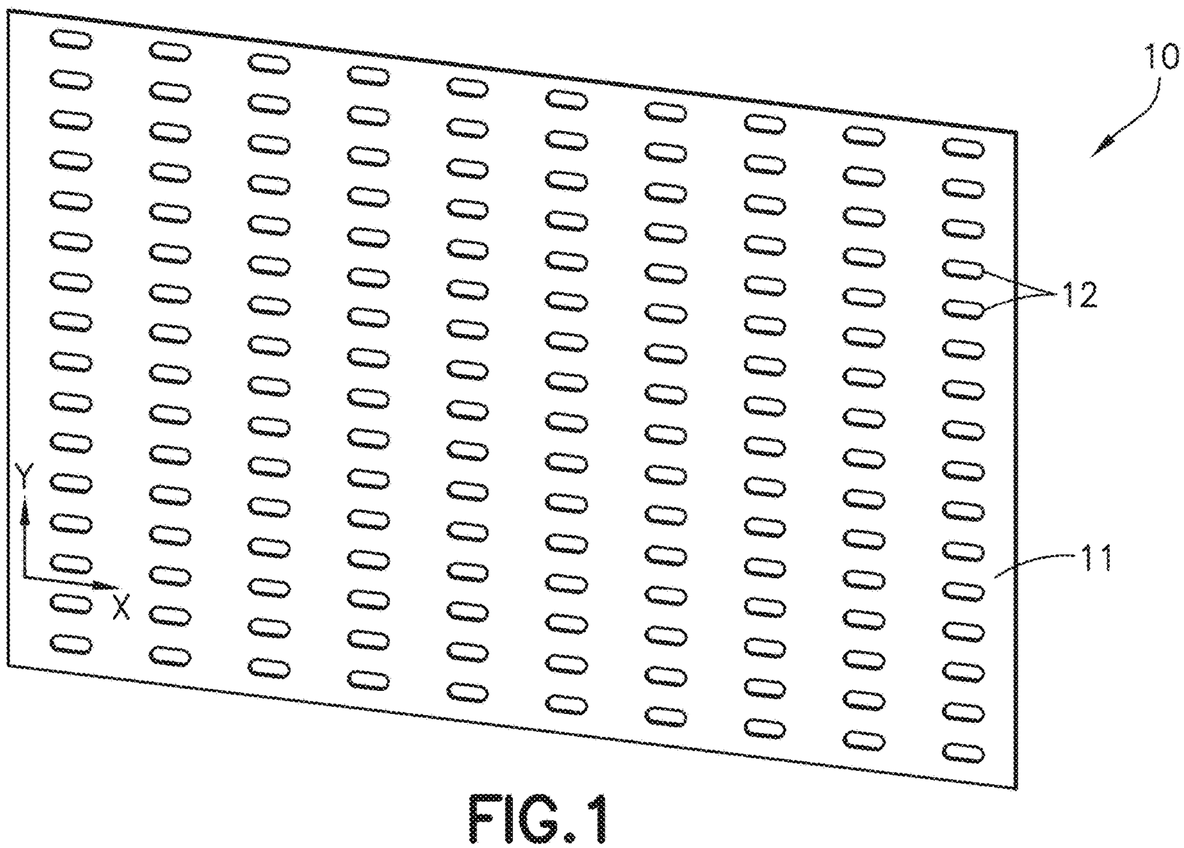
FIG. 1 is a partial perspective view of a protector screen for use against arthropods according to a first aspect of the present disclosure, one edge of this screen being pressed against a wall delimiting an opening in a construction.

FIG. 1 shows, schematically, a protector screen 10 for use against arthropods, in particular insects and spiders, according to a first aspect of the present disclosure.

This screen 10, which in this case forms a glazing element, comprises a plate 11 of plastic material, in this instance poly(methyl methacrylate)—PMMA, obtained by casting. It has a thickness of two (2) mm.

This plate 11 is perforated with oblong ventilation holes 12, these ventilation holes 12 being aligned in two directions (x, y) in the plane of the plate and spaced apart from each other at regular intervals. Naturally, the ventilation holes 12 could alternatively have been arranged in staggered rows.

The opening ratio of this plate 11 is twenty-five (25) %, these ventilation holes 12 having been made by pure water jet cutting.

The section of each of these oblong holes, which are identical, has a value Ga of the order of 3 mm in its largest dimension, i.e. in a direction substantially transverse to the plate, and a value Pa of the order of 800 μm in its other dimension, i.e. substantially in the height direction of same.

Each ventilation hole 12 of this plate 11 has been treated using a composition comprising 95% by volume of acetone and 5% colored fillers, in this instance carbon black pigments, in order to form a layer of colored fillers that helps increase the light transmission of the screen 10.

This plate 11 advantageously has a light transmission coefficient greater than 80%.

Figure 2:
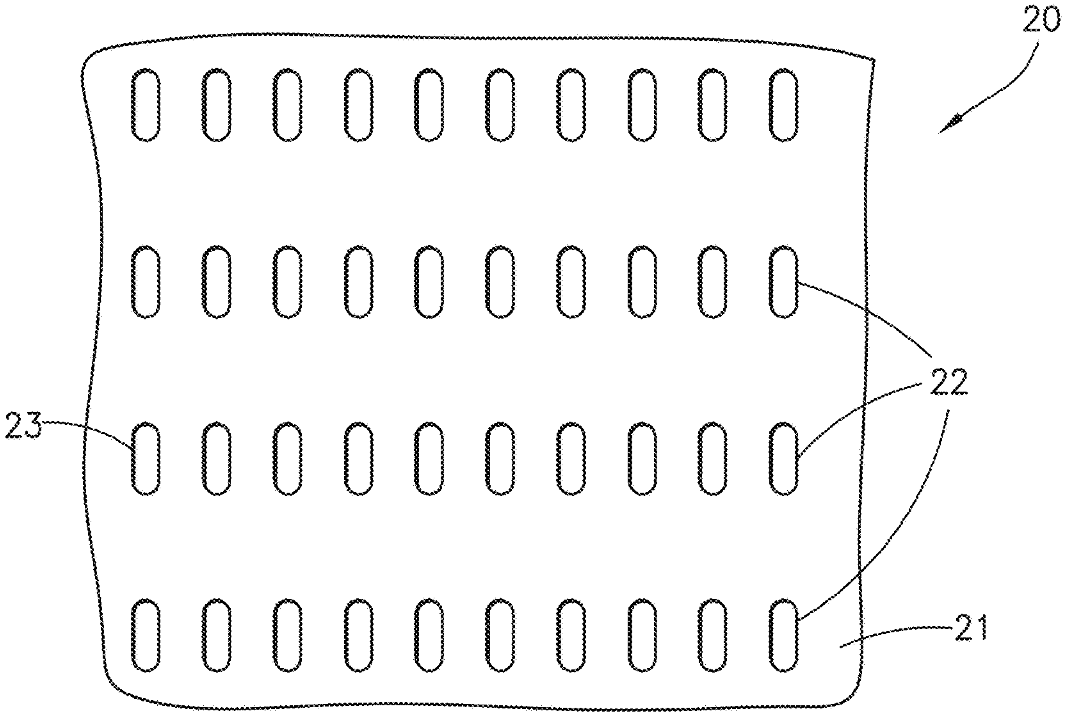
FIG. 2 is a partial enlarged top view of a protector screen for use against arthropods according to a second aspect of the present disclosure.

FIG. 2 shows, schematically, a protector screen 20 for use against arthropods according to a second aspect of the present disclosure.

The protector screen 20 is in this instance formed from a sheet 21 of polycarbonate having a thickness of 250 μm such that the latter is flexible and can be rolled up/unrolled like a blind in order to open or close an opening.

This sheet 21 is perforated with oblong ventilation holes 22, the opening ratio of this sheet being 2.5%.

These ventilation holes 22 have advantageously been formed by laser cutting the sheet 21, and more specifically by means of a $CO_2$ laser cutting machine with a power of 100 W and at a cutting speed of 0.6 m/min. The size of the laser beam spot on the surface of the sheet is approximately 70 μm.

Each ventilation hole 22 of this sheet has then been treated using a composition comprising a solvent, in this instance Pyridine and colored fillers, in this instance carbon black pigments, in order to form a layer 23 improving the light transmission of this sheet.

This sheet 21 has also received an anti-UV surface treatment.

Figure 3:
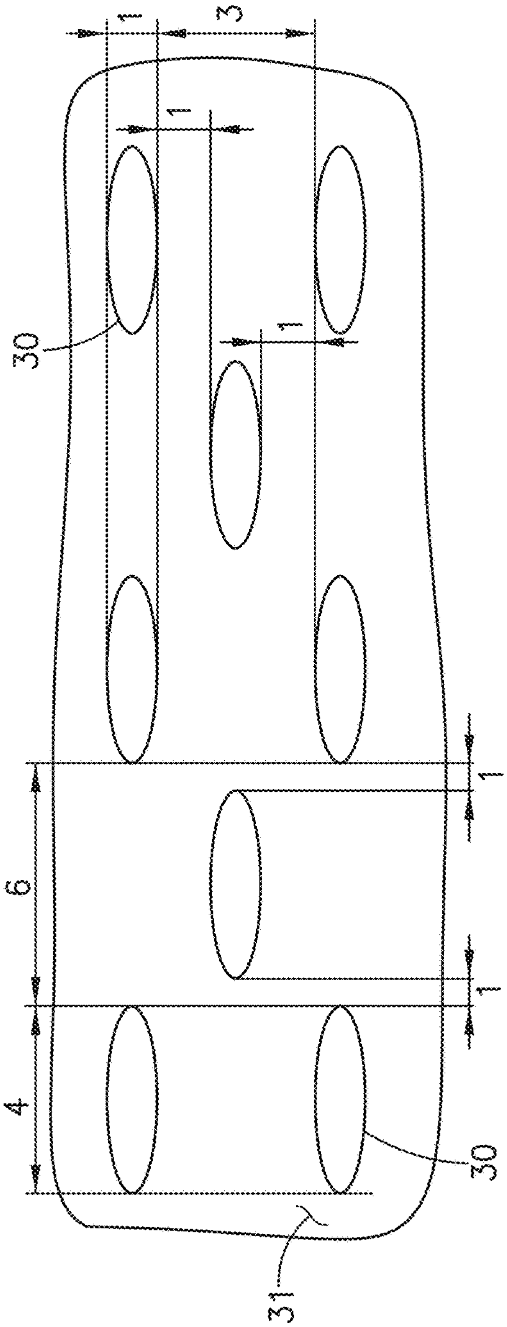
FIG. 3 is a schematic representation of ventilation holes of a protector screen according to a third aspect, these ventilation holes having an elliptical section.

FIG. 3 is a schematic representation of ventilation holes 30 of a protector screen according to a third aspect, these ventilation holes 30 having an elliptical section.

This protector screen comprises a sheet 31 having a thickness of the order of 300 μm.

The edges of this sheet 31 are not perforated, thus allowing the uprights of the frame to obtain a better mechanical grip on the sheet, thus increasing its mechanical resistance, for example to impacts.

The sheet 31, which is transparent, is made from a polycarbonate such as the polycarbonate Makrolon®.

The substantially elliptical ventilation holes 30 of dimensions 1 mm by 4 mm have been obtained by pure water jet cutting.

The holes have been arranged in staggered rows and nested in order to obtain a void density of the order of 0.25 in the useful zone of the protector screen.

The inside of each ventilation hole has received a layer of paint sprayed by means of a can of spray paint comprising a composition of carbon pigments/solvent, so as to obtain a very thin uniform coating thickness of the order of a few microns.

In order to demonstrate the technical advantage contributed by the protector screens of the disclosure, measurements of the light irradiance through a mosquito of the prior art, the protector screens described in FIGS. 1 and 2, before making the ventilation holes, then after making these ventilation holes but before treating them to improve the light transmission coefficient of the corresponding screen, then after applying such a treatment to each ventilation hole, are shown in table I.

These measurements are taken at an ambient temperature of approximately 20° C., using a tungsten light source with a reflector having a power of 45 W, a light meter such as an ISO-TECH ILM-1® luxmeter and a lens for focusing the luminous flux passing through the object interposed between the source and the light meter on the sensor of the latter.

TABLE I

Results of the optical measurements

| Constituent material of the object under study | Measured light intensity value in kLux |
|---|---|
| No object interposed between the light source and the detector - For reference | 8.16 |
| Mosquito net with perpendicular crossing, textile threads | 4.82 |
| Screen of FIG. 1, not perforated | 7.38 |
| Screen of FIG. 1, perforated with untreated oblong holes | 6.90 |
| Screen of FIG. 1, perforated with treated oblong holes | 7.25 |
| Screen of FIG. 2 not perforated | 7.32 |
| Screen of FIG. 2, perforated with untreated oblong holes | 7.19 |
| Screen of FIG. 2, perforated with treated oblong holes | 7.29 |

These measurements clearly show that:

- the light irradiance through the protector screens of the disclosure is considerably higher than that measured through the mosquito nets of the prior art, and
- by treating the ventilation holes and/or the peripheral zone of each ventilation hole in order to form at least one layer increasing the light transmission coefficient, superior light irradiance is obtained compared to the same products without treatment.

Tensile tests have also been carried out on protector screen samples with and without ventilation holes by means of an MTS Autotrac® machine. The test conditions de were as follows:

- dumbbell specimen 160 mm total length, 80 mm useful length, 10 mm useful width, and
- tensile speed of the order of 50 mm/min.

The following measurements were obtained:

tests on specimens without holes: 1162 N breaking strength for a sheet of polycarbonate (PC) 2 mm thick without holes, and tests on specimens with holes: 1025 N breaking strength for a sheet of polycarbonate (PC) 2 mm thick with oval holes and 1027N breaking strength for this same sheet but with oblong holes.

These measurements demonstrate that the ventilation holes made in the sheets have little effect on the tensile performances of same.

Similarly, Charpy impact tests according to standard ISO 179, carried out with a Wolpert Werke Gmbh n'PW5K-E machine, moving object 7.5 Joules, a specimen 80 mm long and 10 mm wide, showed that the presence of ventilation holes has no significant influence on the mechanical strength of the sheets.

Additional tests were carried out to demonstrate the advantageous effects obtained by a protector screen according to the disclosure in terms of cooling an air flow passing therethrough.

Wind tunnel tests were therefore carried out by positioning various protector screens in turn in the middle of a sealed tunnel 110 cm long with an approximately square section having 7.5 cm sides. This tunnel was placed in a closed and thermoregulated enclosure measuring sixty (60) $m^3$.

A variable speed blower with the possibility of heating the blown air, reference number KH2113 (manufactured by Kompernass GmbH, 44867 Bochum, Germany) was placed at the entrance to this tunnel.

The temperature of the air was measured at different locations in the tunnel with temperature sensors, in particular digital precision thermometers.

This tunnel was long enough to have a stabilized flow, and the measurements were taken when the temperature had stabilized.

These tests were carried out with the following protector screens:

*Commercial Mesh Mosquito Net weave coated with polyvinyl chloride (PVC) and 0.26 mm thick, density of holes (t) 38,000 t/$m^2$.

*Screen M1

PMMA sheet 2 mm thick, density of holes (t) 5,000 t/$m^2$, straight (taper-free) shape of the longitudinal section of the ventilation holes, i.e. in a direction extending between the two faces of the sheet, with inlet and outlet diameter of 1.0 mm.

*Screen M2 polycarbonate (PC) sheet 2 mm thick, density of holes (t) 5,000 t/$m^2$, diabolo shape (referred to hereinafter as D shape) of the longitudinal section of the ventilation holes, with inlet and outlet diameter of 1.0 mm, with a constriction having a minimum dimension of 0.6 mm approximately at the center of the thickness of the sheet.

*Screen M3 polycarbonate (PC) sheet 2 mm thick, density of holes (t) 5,000 t/$m^2$, cone-shaped (referred to hereinafter as C shape) longitudinal section of each ventilation hole, with inlet diameter of 1.5 mm and outlet diameter of 0.5 mm.

The air flow rate is arbitrarily denoted Di, where i=1 to 3, the air flow rate increasing as the index i increases.

| | Air flow rate | Inlet temperature | Outlet temperature | Delta T (° C.) |
|---|---|---|---|---|
| Reference test without screen | D1 | 22.5 | 22.5 | 0 |
| Commercial mesh mosquito net | D1 | 22.5 | 22.5 | 0 |
| | D2 | 30.2 | 30.2 | 0 |
| | D3 | 75 | 75 | 0 |
| M1 (straight hole) | D1 | 27 | 27.2 | 0.2 |
| | D2 | 23.7 | 23.3 | 0.4 |
| | D3 | 46.1 | 42.1 | 4 |
| | D3 | 73 | 67 | 6 |
| M2 (D shape) | D1 | 15.7 | 15.4 | 0.3 |
| | D1 | 22.2 | 21.9 | 0.3 |
| | D2 | 24.4 | 23.7 | 0.7 |
| | D2 | 39.1 | 37.1 | 2 |
| | D3 | 37.4 | 31.5 | 6.9 |
| | D3 | 93 | 77 | 16 |
| M3 (C shape) | D1 | 15.5 | 15.1 | 0.4 |
| | D1 | 22 | 21.6 | 0.4 |
| | D2 | 24 | 22.7 | 1.3 |
| | D2 | 37.5 | 34.4 | 0.4 |
| | D3 | 45.9 | 36.4 | 9.5 |
| | D3 | 83 | 69 | 14 |

In conclusion, these thermal tests help demonstrate that:

Commercial mesh mosquito nets have no thermal effect, regardless of the ventilation and/or temperature conditions.

The protector screens of the disclosure, regardless of whether the version is M1, M2 or M3, cool the air passing through them.

The higher the air flow rate, the more significant the cooling of the air

The higher the temperature measured downstream of the tunnel, i.e. after the protector screen, the greater the temperature change.

The presence in each ventilation hole of a significant constriction, i.e. a constriction with a small section, helps increase the temperature difference measured upstream and downstream of the protector screen.

These tests also helped demonstrate that a longitudinal section, i.e. between the two faces of a sheet, in the form of a diabolo helps not only optimize the cooling of the air passing through the screen but also affords the user greater visual comfort, since the footprint of the hole, or its surface area projected on a face, is smaller than a hole with a frustoconical shape, for example.

Additional tests were also carried out in order to study the variation in light transmission through various objects.

The operating conditions were as follows: light source sending a uniform beam onto a lens, which made the luminous flux converge on a fluxmeter in order to measure the quantity of light transmitted. The object to be studied was introduced at the outlet of the light source.

| Object studied | Light intensity transmitted (Lux) |
|---|---|
| Reference measurement - no object inserted | 972 +/− 1 (100%) |
| Commercial mesh mosquito net | 554 +/− 4 (57%) |
| PC, 2 mm, not perforated | 860 +/− 2 (88%) |
| PC, 2 mm, holes untreated, density 5,000 t/m2, D shape | 835 +/− 2 (86%) |
| PC, 2 mm, holes treated, grey blue on both sides, density 5,000 t/m2, D shape | 850 +/− 2 (87%) |
| PC, 2 mm, holes treated, grey blue on both sides, density 10,000 t/m2, D shape | 762 +/− 3 (78%) |
| PC, 2 mm, holes treated, cyan blue on both sides, density 5,000 t/m2, D shape | 846 +/− 3 (87%) |

-continued

| Object studied | Light intensity transmitted (Lux) |
|---|---|
| PC, 2 mm, holes treated, cyan blue on one side, density 5,000 t/m2, C shape | 807 +/− 1 (83%) |
| PC, 2 mm, holes treated, cyan blue on one side, density 7,000 t/m2, C shape | 782 +/− 2 (80%) |
| PC, 2 mm, holes treated, black on both sides, density 5,000 t/m2, D shape | 853 +/− 2 (88%) |
| PC, 2 mm, holes treated, black on one side, density 5,000 t/m2, D shape | 845 +/− 2 (87%) |
| PC, 1 mm, not perforated | 860 +/− 2 (91%) |
| PC, 1 mm, holes treated, grey blue, density 5,000 t/m2, D shape | 856 +/− 2 (88%) |
| PC, 250 μm, not perforated | 934 +/− 1 (96%) |
| PC, 250 μm, holes untreated | 855 +/− 3 (88%) |
| PC, 250 μm, holes treated, black with process 1 on one side, density 5,000 t/m2, C shape | 865 +/− 2 (89%) |
| PC, 250 μm, holes treated, black with process 2 on one side, density 5,000 t/m2, C shape | 875 +/− 2 (90%) |

Note:
* process 1 = laser foaming, process 2 = chemical process.
When not specified, process 2 was implemented.
C shape = conical shape of the longitudinal section of the ventilation holes, i.e. in a direction extending between the two faces of the sheet
D shape = diabolo shape of the longitudinal section of the ventilation hole.

These measurements give rise to the following points:

a) the light irradiance through the commercial mosquito net is far lower than all the screens forming the subject matter of the disclosure, regardless of the shape of the tested ventilation holes, the treatment process used, the density of holes or indeed the color of the layers formed in these ventilation holes in order to improve the light transmission coefficient of the corresponding sheet, b) higher light irradiance is obtained with the formation in each ventilation hole of one or more layers in order to improve the light transmission coefficient of the corresponding sheet than when the ventilation holes of this sheet remain untreated, c)—a range of treatment colors appears optimal (dark colors and, in particular, grey blue) in order to ensure optimal light transmission (a high %), d)—a hole profile (in the thickness) with the "centered diabolo" shape optimizes the aesthetic aspect by reducing the impact of the treatment on vision regardless of the viewing angle, and maximizing light transmission. Indeed, the projected surface area of the hole for a given passage diameter is minimized, regardless of the viewing angle.

Figure 4:
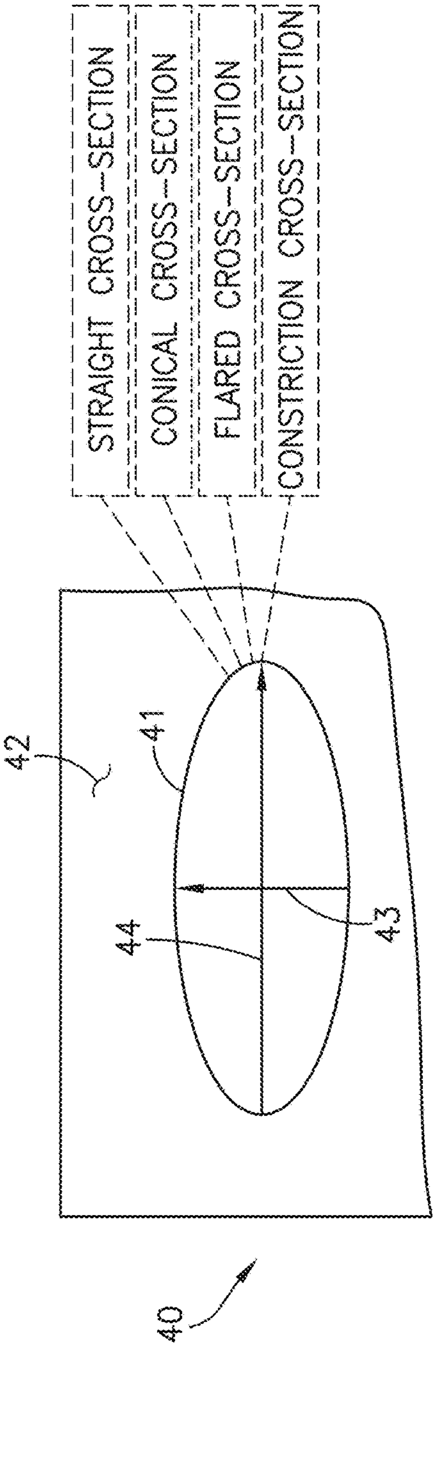
FIG. 4 is a partial enlarged view of a protector screen showing an oblong ventilation hole with its transverse and longitudinal axes.

FIG. 4 is a partial enlarged view of a protector screen 40 showing a single oblong ventilation hole 41. This protector screen 40 comprises a unitary sheet comprising a first face 42 and a second face (not shown). This sheet comprises a plurality of ventilation holes 41 extending and opening on the two faces 42 of this sheet in order to allow air to pass therethrough.

Only the free end of a ventilation hole 41 opening on the first face 42 of this sheet and therefore contained in this face is shown, for the sake of simplicity.

The part, or free end, of the ventilation hole opening on the maximizing first face 42 therefore has a first dimension along an axis 43 transverse to this hole and a second dimension along an axis 44 longitudinal to this hole.

Advantageously, the dimension of this ventilation hole 41 along its longitudinal axis 44 is greater than the largest dimension of the arthropods against which the screen provides protection, whereas its dimension along the transverse axis 43 is less than or equal to the largest dimension of the main body of the arthropods against which the screen provides protection, this main body excluding the head and the appendages of the corresponding arthropods.

This allows a higher air flow rate through the protector screen 40 while guaranteeing its role as a mechanical barrier against the corresponding arthropods.

Figure 5:
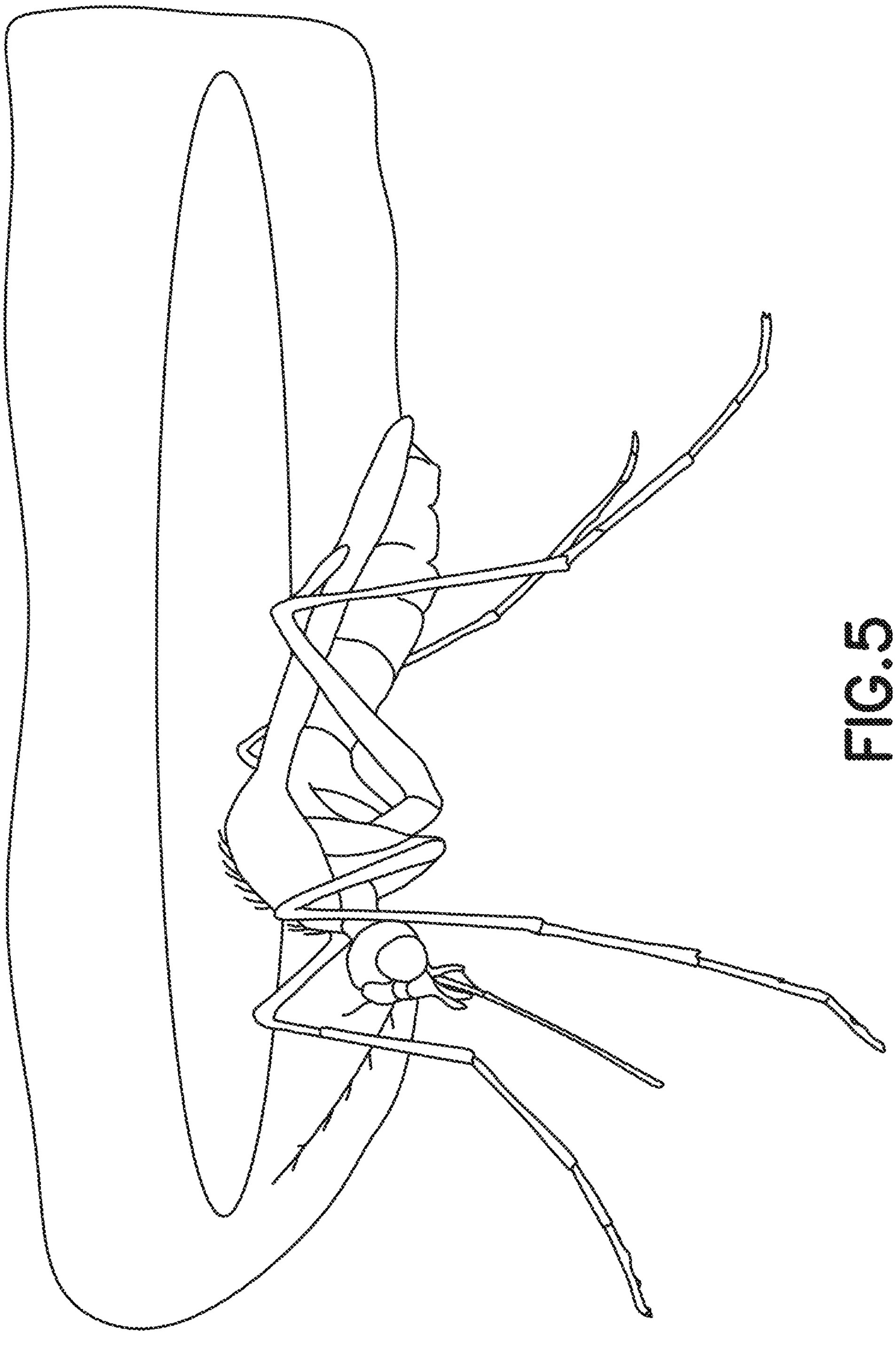
FIG. 5 is a partial enlarged view of a protector screen showing a ventilation hole in front of which a tiger mosquito is placed.

FIG. 5 is an example of the implementation of the screen of FIG. 4 for forming a mechanical barrier against tiger mosquitoes.

What is claimed is:

1. A protector screen for use against arthropods comprising a sheet comprising a core made from glass or from plastic material, said sheet being at least partially transparent, and comprising two faces with a plurality of ventilation holes, each of said ventilation holes having ventilation hole openings and being configured to prevent arthropods from passing therethrough, said ventilation holes being intended to allow a gaseous fluid to pass through the protector screen, characterized in that at least one of portions of at least some of said ventilation hole openings on said faces has a straight, elongate cross section, said straight, elongate cross section comprising a longitudinal axis and a transverse axis, a dimension of each of said portions along the longitudinal axis being greater than a largest dimension of the arthropods against which the screen provides protection, a dimension of each portion along the transverse axis being less than or equal to a largest dimension of a main body of the arthropods against which the screen provides protection, the main body excluding a head and appendages of the corresponding arthropods, wherein each ventilation hole comprises a lateral wall, wherein the lateral wall is unitary for at least some of said ventilation holes, wherein a portion of at least one face of the two faces of said sheet delimiting an edge of each of these ventilation holes and/or the lateral wall comprises at least one layer configured to increase the light transmission coefficient of said sheet relative to the light transmission coefficient of a same sheet whose ventilation holes are not provided with said at least one layer.

2. The screen as claimed in claim 1, characterized in that at least a majority of the ventilation holes has a constant cross section or comprises a reduction in cross section in a direction extending between the two faces of said sheet.

3. The screen as claimed in claim 2, characterized in that each ventilation hole has a flared shape or comprises a constriction.

4. The screen as claimed in claim 1, characterized in that, at least a majority of said ventilation holes comprises a reduction in cross section in a direction extending between the two faces of said sheet configured to cool the air passing through said at least a majority of said ventilation holes.

5. The screen as claimed in claim 1, characterized in that lateral movement of a ventilation hole during elastic deformation of the sheet being $\Delta x$, $2\ \Delta x$ is less than or equal to the largest dimension of the main body of these arthropods against which the screen provides protection, the main body excluding the head and the appendages of the corresponding arthropods.

6. The screen as claimed in claim 1, characterized in that the cross section of each ventilation hole has a value Ga of between 0.1 and 8 mm at a largest dimension of each ventilation hole and a value Pa of between 500 μm and 1.2 mm in another dimension of each ventilation hole, the value Ga being greater than an arthropod largest dimension of the against which the screen provides protection, whereas the value Pa is less than or equal to a main body largest dimension of the arthropods against which the screen provides protection, a main body of the arthropod excluding the head and the appendages of the corresponding arthropods.

7. The screen as claimed in claim 1, characterized in that said lateral wall comprises a plurality of layers configured to increase the light transmission coefficient of said sheet.

8. The screen as claimed in claim 1, characterized in that said at least one layer is placed at a surface of said lateral wall and/or in the thickness of said sheet.

9. The screen as claimed in claim 1, characterized in that said at least one layer is a layer of colored fillers.

10. A method of using a protector screen against arthropods the method comprising:

insulating a space from mosquitoes, in particular tiger mosquitoes, with the protector screen while allowing ventilation of the space, said space being intended to be occupied by humans, animals or food, wherein the protector screen includes:

a sheet comprising a core made from glass or from plastic material, said sheet being at least partially transparent, and comprising two faces with a plurality of ventilation holes, each of said ventilation holes having ventilation hole openings and being configured to prevent arthropods from passing therethrough, said ventilation holes being intended to allow a gaseous fluid to pass through the protector screen, characterized in that at least one of portions of at least some of said ventilation hole openings on said faces has a straight, elongate cross section, said straight, elongate cross section comprising a longitudinal axis and a transverse axis, a dimension of each of said portions along the longitudinal axis being greater than a largest dimension of the arthropods against which the screen provides protection, a dimension of each portion along the transverse axis being less than or equal to a largest dimension of a main body of the arthropods against which the screen provides protection, the main body excluding a head and appendages of the corresponding arthropods, wherein each ventilation hole comprises a lateral wall that is unitary, for at least some of said ventilation holes, a portion of at least one face of the two faces of said sheet delimiting an edge of each of these ventilation holes and/or the lateral wall comprises at least one layer configured to increase the light transmission coefficient of said sheet relative to the light transmission coefficient of a same sheet whose ventilation holes are not provided with said at least one layer.

* * * * *